(12) United States Patent
Firstenberger (10) Patent No.: US 9,953,318 B1
(45) Date of Patent: Apr. 24, 2018

(54) AUTOMATIC TRANSACTION-BASED VERIFICATION OF ACCOUNT OWNERSHIP

(71) Applicant: INTUIT INC., Mountain View, CA (US)

(72) Inventor: Andrew B. Firstenberger, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 370 days.

(21) Appl. No.: 14/720,501

(22) Filed: May 22, 2015

(51) Int. Cl.
G06Q 20/40 (2012.01)
(52) U.S. Cl.
CPC .................................. G06Q 20/40 (2013.01)
(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | | |
|---|---|---|---|---|
| 7,726,561 B2* | 6/2010 | Katyal | ................... | G06Q 20/02 235/379 |
| 7,865,412 B1* | 1/2011 | Weiss | ..................... | G06Q 20/10 705/30 |
| 8,909,548 B1* | 12/2014 | Ran | ........................ | G06Q 40/02 705/30 |
| 8,996,407 B2* | 3/2015 | Weiss | ..................... | G06Q 20/02 705/14.73 |
| 9,286,332 B1* | 3/2016 | Roumeliotis | .......... | G06Q 40/00 |

* cited by examiner

*Primary Examiner* — Frantzy Poinvil
(74) *Attorney, Agent, or Firm* — Patterson + Sheridan, LLP (57) ABSTRACT

The disclosed embodiments provide a system that verifies user access to financial accounts. During operation, the system obtains a first set of financial data representing one or more financial transactions of a first financial account. Next, the system matches the one or more financial transactions to a second set of financial data representing issuance of the one or more financial transactions from a second financial account. The system then uses the matched financial transactions to automatically generate a first verification of ownership of the first financial account by a user without requiring input associated with the one or more financial transactions from the user.

17 Claims, 5 Drawing Sheets

AUTOMATIC TRANSACTION-BASED VERIFICATION OF ACCOUNT OWNERSHIP

RELATED APPLICATION

The subject matter of this application is related to the subject matter in a co-pending non-provisional application by inventors Robert E. Lee, Thomas Pigoski and Douglas Foiles, entitled "Verifying a User's Identity Based on Adaptive Identity Assurance Levels," having Ser. No. 14/528,973 and filing date 30 Oct. 2014.

BACKGROUND

Related Art

The disclosed embodiments relate to user verification. More specifically, the disclosed embodiments relate to techniques for performing automatic transaction-based verification of account ownership by users.

User accounts with web-based applications are typically accessed through a computing device with network connectivity. For example, a user may use a laptop computer or mobile phone to access data and features provided by a web application. Furthermore, access to a user account is typically granted only after valid authentication credentials are provided by the user. For example, the user may be required to input a valid username and password to a financial-management application and/or financial account before the user is allowed to access features or data associated with the account.

Some user accounts may require additional verification of user identities before granting access to certain features and/or establishing a higher identity assurance level for a user. For example, the user may be required to verify ownership of a financial account before linking the financial account to a user account such as an online payment account, utility account, or an electronic commerce account. During such verification, a service associated with the user account may make a number of small deposits into the financial account. The user may complete the verification process by logging in to the financial account, looking up the amounts deposited, and providing the correct amounts to the service. After the user's ownership of the financial account is verified, the user may be allowed to transfer funds between the accounts or access other features associated with linking the accounts.

On the other hand, users may find conventional techniques for verifying financial accounts to be tedious or confusing. Continuing with the above example, the user may be required to manually initiate the verification process from the user account, wait for the deposits to be made, access the financial account to view the deposited amounts, and manually enter the deposited amounts after logging in to the user account. The verification process may thus be completed only after all steps have been performed correctly by the user, which may span a number of days.

SUMMARY

Online user accounts may be created through a web-based user interface from network-enabled devices such as personal computers, laptop computers, tablet computers and mobile phones. For example, an online user account may be created by obtaining authentication credentials (e.g., a username and password) from a user through a registration interface for the online user account. The user may also provide the authentication credentials to a data-management system that aggregates data associated with the online user account and other online user accounts belonging to the user. The user may then access one or more visualizations of the aggregated data, perform one or more tasks using the aggregated data, and otherwise process the aggregated data. For example, the user may use aggregated financial data from multiple financial accounts to create a budget, track finances and spending, perform payroll, or schedule payments and transfers.

The data-management system may also perform transaction-based verification of account ownership by the user. In particular, the data-management system may use financial transactions for a financial account of the user to automatically verify that the user has ownership of the financial account, independently of obtaining authentication credentials for the financial account from the user. For example, the data-management system may verify the user's possession of the financial account by making or detecting a number of "micro-deposits" into the financial account and matching the deposits to deposited amounts from financial data aggregated from the financial account.

The data-management system may then use the verification to link the financial account with another financial account, establish a higher identity assurance level for the user, or establish a relationship between the user and another user associated with the other financial account. By using financial data to automatically verify user access to the financial account, the data-management system may reduce overhead associated with conventional verification techniques that require manual lookup and input of deposited amounts by the user to verify the user's access to the financial account.

The disclosed embodiments provide a system that verifies user access to financial accounts. During operation, the system obtains a first set of financial data representing one or more financial transactions of a first financial account. Next, the system matches the one or more financial transactions to a second set of financial data representing issuance of the one or more financial transactions from a second financial account. The system then uses the matched financial transactions to automatically generate a first verification of ownership of the first financial account by a user without requiring input associated with the one or more financial transactions from the user.

In some embodiments, matching the one or more financial transactions to the second set of financial data includes storing the first and second sets of financial data in memory, and storing, in memory, a mapping of a first identifier for the one or more financial transactions from the first set of financial data to a second identifier representing issuance of the one or more financial transactions from the second financial account.

In some embodiments, the system also updates an identity assurance level for the user based on the verified ownership of the first financial account, and uses the updated identity assurance level to enable access to one or more features associated with the first financial account by the user.

In some embodiments, the system also issues the one or more financial transactions from the second financial account, and updates the second set of financial data with issuance of the one or more financial transactions from the second financial account.

In some embodiments, the system also uses the matched financial transactions to establish a relationship between the user and another user associated with the second financial account.

In some embodiments, the relationship is a customer relationship, an employment relationship, a landlord-tenant relationship, and/or a lending relationship.

In some embodiments, the system also uses the matched financial transactions to automatically generate a second verification of ownership of the second financial account by the user.

In some embodiments, matching the one or more financial transactions to the second set of financial data includes at least one of matching transaction amounts in the first and second sets of financial data, and using the first and second sets of financial data to verify an issuer of the one or more financial transactions.

In some embodiments, the one or more financial transactions are issued by a service associated with the second financial account.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Online user accounts may be created through a web-based user interface from network-enabled devices such as personal computers, laptop computers, tablet computers and mobile phones. For example, an online user account may be created by obtaining authentication credentials (e.g., a username and password) from a user through a registration interface for the online user account. The user may also provide the authentication credentials to a data-management system that aggregates data associated with the online user account and other online user accounts belonging to the user. The user may then access one or more visualizations of the aggregated data, perform one or more tasks using the aggregated data, and otherwise process the aggregated data. For example, the user may use aggregated financial data from multiple financial accounts to create a budget, track finances and spending, perform payroll, or schedule payments and transfers.

The data-management system may also perform transaction-based verification of account ownership by the user. In particular, the data-management system may use financial transactions for a financial account of the user to automatically verify that the user has ownership of the financial account, independently of obtaining authentication credentials for the financial account from the user. For example, the data-management system may verify the user's possession of the financial account by making or detecting a number of "micro-deposits" into the financial account and matching the deposits to deposited amounts from financial data aggregated from the financial account.

The data-management system may then use the verification to link the financial account with another financial account, establish a higher identity assurance level for the user, or establish a relationship between the user and another user associated with the other financial account. By using financial data to automatically verify user access to the financial account, the data-management system may reduce overhead associated with conventional verification techniques that require manual lookup and input of deposited amounts by the user to verify the user's access to the financial account.

Figure 1:
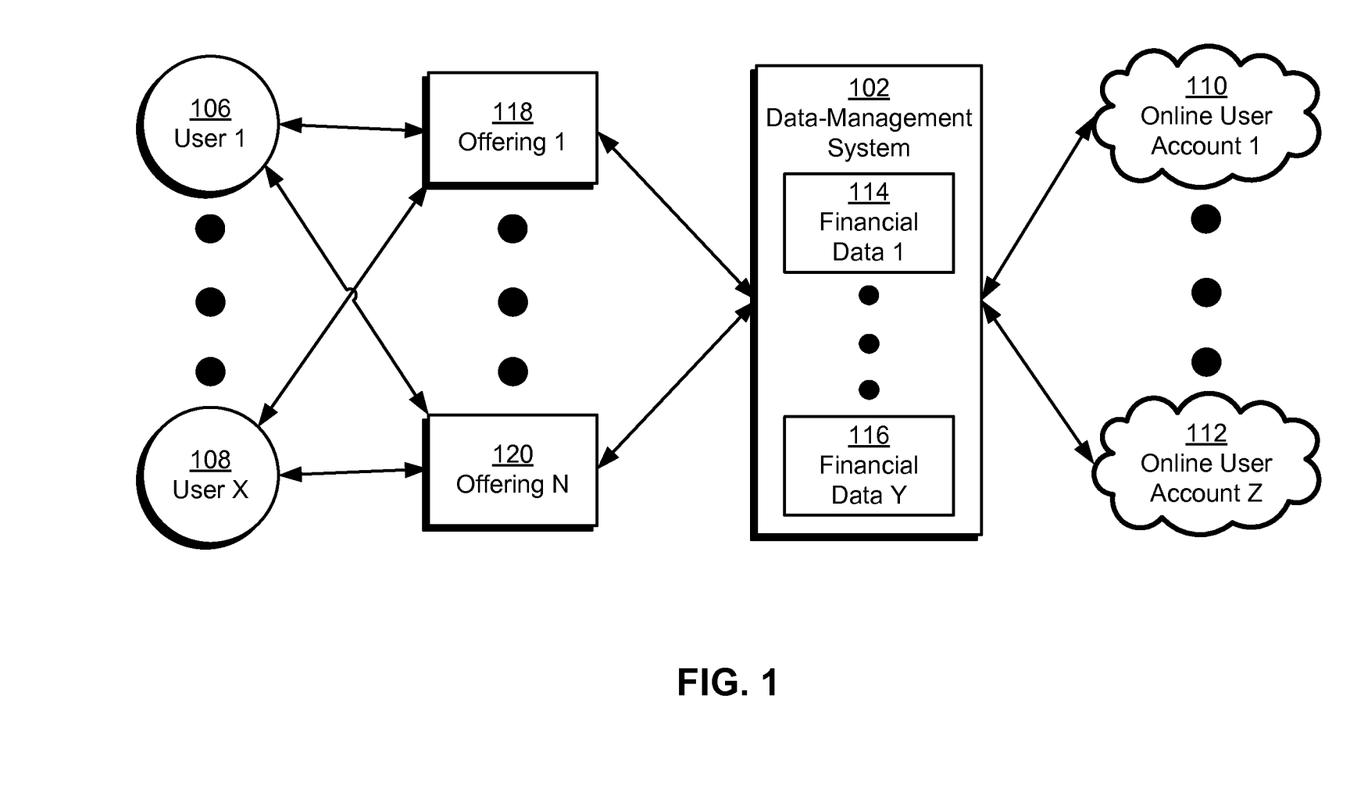
FIG. 1 shows a schematic of a system in accordance with the disclosed embodiments.

FIG. 1 shows a schematic of a system in accordance with the disclosed embodiments. The system includes a data-management system 102 that interacts with a number of online user accounts (e.g., online user account 1 110, online user account z 112) and a number of offerings (e.g., offering 1 118, offering n 120).

Data-management system 102 may aggregate financial data (e.g., financial data 1 114, financial data y 116) associated with the online user accounts and provide the financial data to the offerings. A set of users (e.g., user 1 106, user x 108) may use the offerings to access, store, and/or manipulate the financial data. For example, data-management system 102 may aggregate the financial data from online banking accounts and/or other financial accounts of the users. The aggregated financial data may include bills, invoices, receipts, tax forms, statements, account balances, paychecks, and/or financial documents of the users. The offerings may obtain the aggregated financial data from data-management system 102 and display the financial data to the users. The offerings may also allow the users to perform tasks related to the financial data, such as generating payroll, tracking inventory, managing invoices, managing finances, creating a budget, filing taxes, paying bills, tracking financial transactions, and/or generating reports.

As a result, data-management system 102 may provide a centralized mechanism for aggregating financial data from online user accounts with various financial institutions and/or other providers of financial data. The financial data may then be used by a number of software offerings related to financial management and/or accounting, such as tax-preparation applications, small-business accounting applications, and/or personal financial management applications.

To obtain the financial data, data-management system 102 may interface with financial institutions, government agencies, merchants, employers, and/or other providers of financial data. For example, data-management system 102 may communicate with the providers over one or more networks, such as local area networks (LANs), wide area networks (WANs), personal area networks (PANs), virtual private networks, intranets, cellular networks, Wi-Fi (Wi-Fi® is a registered trademark of Wi-Fi Alliance) networks, Bluetooth (Bluetooth® is a registered trademark of Bluetooth SIG, Inc.) networks, universal serial bus (USB) networks, and/or Ethernet networks. During communication with the providers, data-management system 102 may use web services and/or other network-based services to log in to the online user accounts and obtain financial data from the online user accounts. For example, data-management system 102 may obtain authentication credentials for the online user accounts from the users, access the online user accounts using the authentication credentials, and use predetermined user flows with the providers to navigate to web pages containing the financial data and scrape the financial data from the web pages.

In one or more embodiments, data-management system 102 includes functionality to use the aggregated financial data to perform automatic transaction-based verification of account ownership for the users. As described in further detail below, data-management system 102 may obtain a first set of financial data representing one or more financial transactions of a first financial account. Next, data-management system 102 may match the financial transaction(s) to a second set of financial data representing issuance of the financial transaction(s) from a second financial account. Data-management system 102 may then use the matched financial transactions to automatically generate a verification of ownership of one or both financial accounts by a user without requiring input associated with the one or more financial transactions from the user. Consequently, data-management system 102 may reduce overhead associated with manual user lookup and input of transaction amounts during conventional verification of user access to financial accounts.

Figure 2:
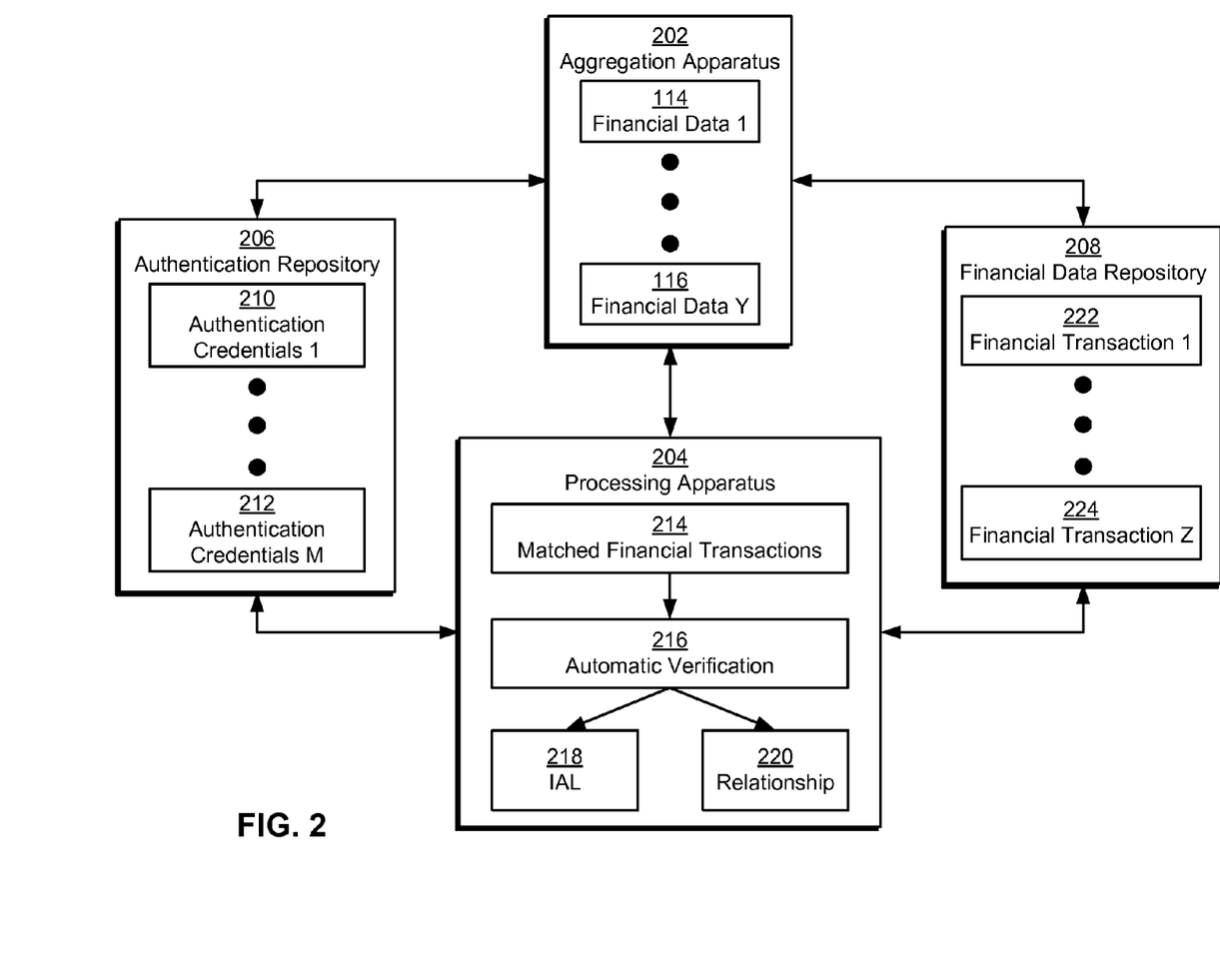
FIG. 2 shows a system for verifying user access to financial accounts in accordance with the disclosed embodiments.

FIG. 2 shows a system for verifying user access to financial accounts in accordance with the disclosed embodiments. The system may be a data-management system, such as data-management system 102 of FIG. 1. As shown in FIG. 2, the system includes an aggregation apparatus 202 and a processing apparatus 204. Each of these components is described in further detail below.

Aggregation apparatus 202 may aggregate financial data (e.g., financial data 1 114, financial data y 116) from a number of online user accounts. As mentioned above, the online user accounts may be associated with financial institutions, government agencies, employers, merchants, and/or other providers of financial data. To aggregate the financial data, aggregation apparatus 202 may obtain stored authentication credentials (e.g., authentication credentials 1 210, authentication credentials m 212) for each online user account and use the authentication credentials to access the online user account. For example, aggregation apparatus 202 may obtain a username and password, biometric identifier, personal identification number (PIN), certificate, and/or other authentication credentials for the online user account from authentication repository 206 and use the authentication credentials to log in to the online user account as the user.

Authentication credentials in authentication repository 206 may be provided by the users and stored for subsequent use by the data-management system. For example, the users may provide authentication credentials for online banking accounts and/or other types of online user accounts during registration with the data-management system. The users may also add new authentication credentials to authentication repository 206 and/or modify existing authentication credentials in authentication repository 206 during the addition and/or update of online user accounts within an offering that uses financial data aggregated by the data-management system.

Aggregation apparatus 202 may also use a set of predefined user flows for websites, web applications, and/or other web-based providers of the online user accounts to aggregate financial data from the online user accounts. Each user flow may identify a sequence and/or layout of user-interface elements, Uniform Resource Locators (URLs), web pages, files, and/or other attributes that may be used to navigate the online user accounts and aggregate financial data from the online user accounts. For example, aggregation apparatus 202 may use a user flow for a financial institution website to log in to a user's online banking account and navigate within the website to one or more web pages containing account information for the online banking account. Aggregation apparatus 202 may scrape the account information from the web page(s) and store the account information, along with other financial data from other online user accounts, in a financial data repository 208.

As shown in FIG. 2, some or all of the financial data aggregated by aggregation apparatus 202 may be stored as a set of financial transactions (e.g., financial transaction 1 222, financial transaction z 224) in financial data repository 208. Each financial transaction may specify a type of the financial transaction, such as a deposit, withdrawal, fee, interest payment, transfer, loan payment, and/or bill payment. The financial transaction may also include information such as a date of the financial transaction, a description of the financial transaction, an amount of the financial transaction, a status of the financial transaction (e.g., pending, completed, denied, cancelled, etc.), and/or the account information (e.g., account number, account owner, financial institution, etc.) for the financial account from which the financial transaction was aggregated.

After the financial data is aggregated by aggregation apparatus 202, processing apparatus 204 may use the financial data to provide an automatic verification 216 of ownership of a financial account by a user without requiring input associated with one or more financial transactions used to perform the verification. For example, processing apparatus 204 may periodically (e.g., on a daily or hourly basis) analyze recently aggregated financial data in financial data repository 208 to automatically verify user ownership of financial accounts associated with the financial data.

First, processing apparatus 204 may obtain, from aggregation apparatus 202 and/or financial data repository 208, a first set of financial data representing one or more financial transactions of a first financial account. For example, processing apparatus 204 may query financial data repository 208 for records of financial transactions listed under the account number, account owner, and/or other identifying attributes of the first financial account.

Next, processing apparatus 204 may match the financial transactions to a second set of financial data representing issuance of the financial transactions from a second financial account. Continuing with the above example, processing apparatus 204 may additionally query financial data repository 208 for records of financial transactions under the second financial account that match one or more financial transactions of the first financial account. Alternatively, processing apparatus 204 may receive financial data for one or both financial accounts from aggregation apparatus 202 (e.g., as the financial data is aggregated from the financial account(s)). If the transaction amounts, dates, and/or other attributes of the financial transactions can be matched across financial data from both financial accounts, processing apparatus 204 may generate automatic verification 216 of the user's ownership of one or both financial accounts.

Prior to matching financial transactions in the first and second sets of financial data, processing apparatus 204 and/or another component of the system may issue the financial transaction(s) from the second financial account and update the second set of financial data with issuance of the financial transaction(s). For example, the system may include an offering that provides financial-management, accounting, tax preparation, payroll, money transfer, and/or other financial services to the users. The offering may include functionality to verify ownership of financial accounts by making one or more "micro-deposits" into the financial accounts. As a result, the offering and/or processing apparatus 204 may generate and/or store records of the issued micro-deposits and match the records to aggregated financial data from the financial accounts that contain the dates, deposited amounts, and/or account number into which the micro-deposits were deposited.

Conversely, the financial transaction(s) may be issued from and directed to external financial accounts, and processing apparatus 204 may perform automatic verification 216 by matching records of financial transactions in the first and second sets of financial data using financial data from aggregation apparatus 202 and/or financial data repository 208. First, automatic verification 216 may be performed in conjunction with an external account-verification process. For example, a user may initiate verification of the first financial account from a second financial account with a third-party online payments system by providing a routing number and/or account number of the first financial account to the online payments system. The user may also provide authentication credentials for both financial accounts to the data-management system, and aggregation apparatus 202 may use the authentication credentials to retrieve financial data from both financial accounts.

To verify the first financial account, the online payments system may make a number of micro-deposits into the first financial account and require the user to access (e.g., log in to) the first financial account, look up the deposited amounts, and enter the deposited amounts into the online payments system. Processing apparatus 204 may leverage the verification process of the online payments system to perform a separate verification (e.g., automatic verification 216) of the user's ownership of the first financial account by identifying the issuance of the micro-deposits from financial data aggregated from the second financial account and matching the issued micro-deposits to financial data aggregated from the first financial account.

Second, processing apparatus 204 may perform automatic verification 216 independently of user-triggered account verification such as a user request to link two financial accounts or access features that are enabled after a financial account is verified. For example, the first and second financial accounts may be bank accounts, online payments accounts, and/or other online user accounts for which the data-management system has authentication credentials. The first and second financial accounts may be owned by the same user or different users, and the user(s) may use offerings or services associated with the data-management system to perform tasks (e.g., tax preparation, accounting, financial management, payroll, bill payment, invoicing, etc.) by conducting one or more financial transactions between the first and second financial accounts. After a given task (e.g., payment, transfer, purchase, sale, etc.) involving both financial accounts is scheduled or requested by the user(s), aggregation apparatus 202 and/or processing apparatus 204 may obtain a record of the task from the offering or service from which the task was scheduled. Once a financial transaction for carrying out the task is conducted between the financial accounts, financial data containing records of the financial transaction with both financial accounts may be aggregated by aggregation apparatus 202. Processing apparatus 204 may then use the record of the task and the aggregated financial data to verify ownership of one or both financial accounts by the respective user(s).

Alternatively, the task may be initiated from a third-party service that is not closely coupled with the data-management system. For example, a first user may initiate a funds transfer to a second user through a third-party online payments system. As a result, the online payments system may not explicitly communicate the scheduling or execution of the funds transfer to the data-processing system, even when both users have provided authentication credentials for their financial accounts with the online payments system to the data-processing system. Instead, processing apparatus 204 may identify the funds transfer from matched financial transactions 214 in financial data aggregated by aggregation apparatus 202 and use additional information from matched financial transactions 214 (e.g., sender and recipient names, contact information, account numbers, etc.) to verify both user identities and establish ownership of the financial accounts by the respective users.

After automatic verification 216 is produced from matched financial transactions 214 between the first and second financial accounts, processing apparatus 204 may update an identity assurance level (IAL) 218 for the user(s) of one or both financial accounts. IAL 218 may represent a degree of certainty that the user(s) are who they claim to be. In addition, processing apparatus 204 may set IAL 218 based on the completion of various identity-proofing techniques by the user(s), as described in a co-pending non-provisional application by inventors Robert E. Lee, Thomas Pigoski and Douglas Foiles, entitled "Verifying a User's Identity Based on Adaptive Identity Assurance Levels," having Ser. No. 14/528,973 and filing date 30 Oct. 2014, which is incorporated herein by reference.

As a result, automatic verification 216 may represent the successful completion of an identity-proofing technique by the user(s), and IAL 218 may be increased accordingly. In turn, the updated IAL 218 may be used to enable access to one or more features associated with one or both financial accounts by the user(s). For example, a higher IAL 218 that is achieved after verifying ownership of a financial account by a user may allow the user or a representative of the user to access additional information (e.g., tax forms) related to the financial account, transfer larger sums of money using the financial account, and/or make additional changes to the financial account.

Processing apparatus 204 may also use matched financial transactions 214 and/or automatic verification 216 to establish a relationship 220 between two users associated with the financial accounts. Relationship 220 may be identified based on elements and/or patterns associated with matched financial transactions 214. For example, processing apparatus 204 may establish a customer relationship between the users if matched financial transactions 214 indicate the transmission of one or more purchases, invoices, payments, and/or receipts between the users. In another example, processing apparatus 204 may establish an employment relationship if matched financial transactions 214 include a series of payroll transactions between the users. In a third example, processing apparatus 204 may establish a landlord-tenant relationship if matched financial transactions 214 include a series of monthly transfers of the same amount from one financial account to another. In a fourth example, processing apparatus 204 may establish a lending relationship if matched financial transactions 214 include a series of regular transfers of the same amount from one financial account to another financial account with the same financial institution.

Because automatic verification 216 is generated based on matched financial transactions 214 from aggregated financial data, processing apparatus 204 may verify ownership of one or more financial accounts associated with matched financial transactions 214 without requiring input from the user. Moreover, by automating the verification of user ownership of financial accounts, the system of FIG. 2 may reduce overhead and/or confusion associated with conventional account-verification techniques that require manual user input of transacted amounts. Finally, the extraction of matched financial transactions 214 from financial data aggregated across a large set of users, financial accounts, and/or financial transactions may allow automatic verification 216 to be performed "on the fly" for various financial accounts involved in financial transactions among the users. In turn, the increased verification of financial account ownership may increase the level of security and/or features associated with the financial accounts and/or data-management system, thus improving use of the financial accounts and/or data-management system by the users.

Those skilled in the art will appreciate that the system of FIG. 2 may be implemented in a variety of ways. First, aggregation apparatus 202, processing apparatus 204, authentication repository 206, and financial data repository 208 may be provided by a single physical machine, multiple computer systems, one or more virtual machines, a grid, one or more databases, one or more file systems, and/or a cloud computing system. Aggregation apparatus 202 and processing apparatus 204 may additionally be implemented together and/or separately by one or more hardware and/or software components and/or layers.

Second, aggregation apparatus 202 and processing apparatus 204 may be adapted to perform automatic verification 216 using various types of financial transactions and/or financial accounts. For example, the system of FIG. 2 may verify user ownership of financial accounts based on transactions associated with dividend payments from stocks, interest payments, mortgage payments, credit card payments, payroll payments, and/or other types of financial transactions across brokerage accounts, bank accounts, online payments accounts, credit card accounts, loan accounts, and/or other types of financial accounts.

Figure 3:
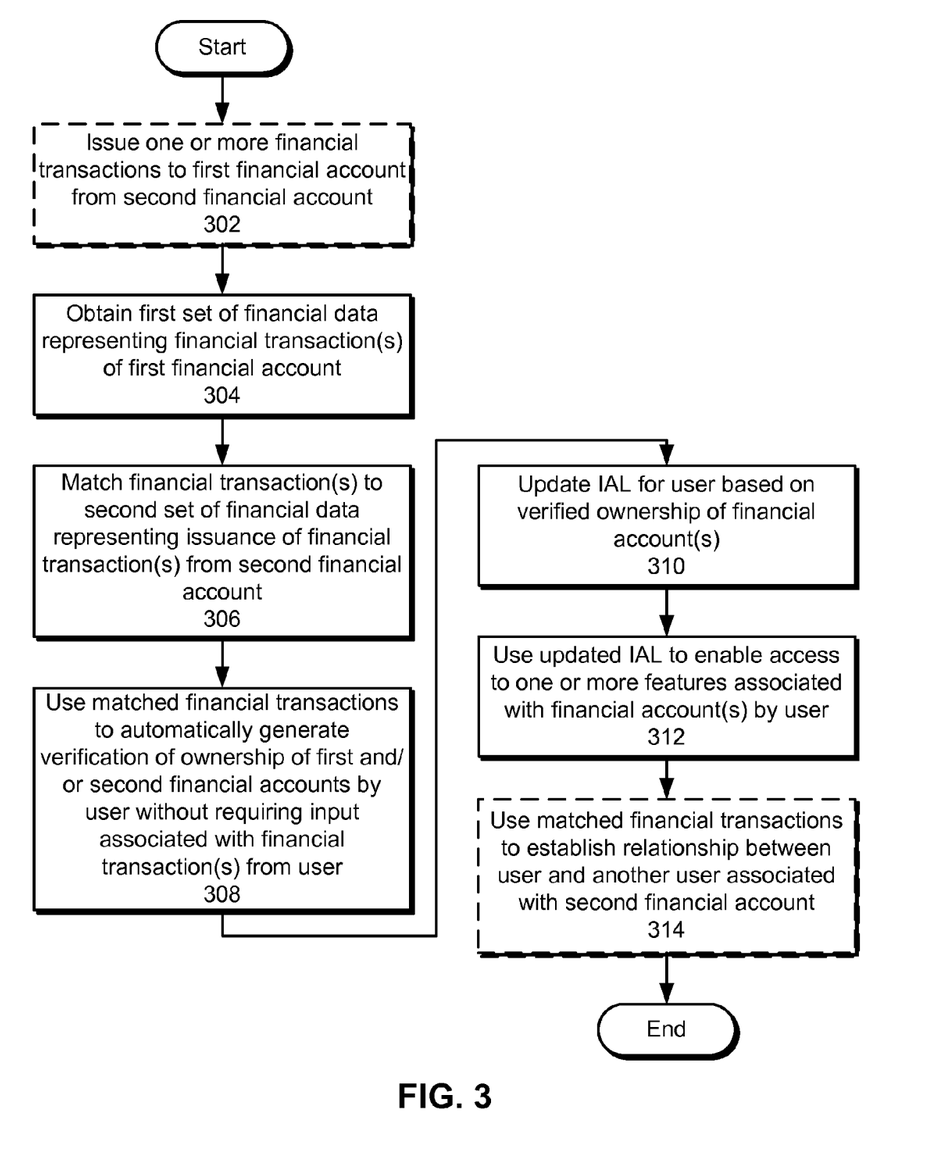
FIG. 3 shows a flowchart illustrating the process of verifying user access to financial accounts in accordance with the disclosed embodiments.

FIG. 3 shows a flowchart illustrating the process of verifying user access to financial accounts in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

First, one or more financial transactions are optionally issued to a first financial account from a second financial account (operation 302). For example, the financial transaction(s) may be issued from a service associated with the second financial account, such as a financial-management application, online-payment service, funds-transfer service, financial-data service, data-management system (e.g., data-management system 102 of FIG. 1), and/or electronic commerce website. Alternatively, the financial transaction(s) may be used by the service to verify user ownership of the first and/or second financial accounts independently of the entity or financial account from which the financial transaction(s) were issued.

Next, a first set of financial data representing the financial transaction(s) of the first financial account is obtained (operation 304). For example, the first set of financial data may be aggregated from the first financial account after logging in to the first financial account using authentication credentials for the first financial account provided by a user.

The financial transaction(s) are matched to a second set of financial data representing issuance of the financial transaction(s) from the second financial account (operation 306). For example, records of the issuance of the financial transaction(s) may be aggregated from the second financial account. Alternatively, if the financial transaction(s) were issued by a service used to perform automated transaction-based verification of account ownership, the second set of financial data may be updated with the issuance of the financial transaction(s) from the second financial account after the financial transaction(s) are issued. Transaction dates, transaction amounts, account numbers, account owners, and/or other details from the first and second sets of financial data may then be used to match issuance of the financial transaction(s) from the second financial account to receipt of the financial transaction(s) at the first financial account. The first and second sets of financial data may also be used to verify an issuer of the financial transaction(s). For example, the financial data may be used to identify an entity (e.g., service or financial institution) from which the financial transaction(s) were issued and verify that the user has a financial account with the entity and/or requested verification of the first financial account with the entity.

The matched financial transactions are then used to automatically generate a verification of ownership of the first and/or second financial accounts by a user without requiring input associated with the financial transaction(s) from the user (operation 308). For example, a user may be verified as the owner of both financial accounts if the user can provide authentication credentials for accessing both financial accounts and the matched financial transactions indicate successful completion of a financial transaction between the financial accounts. Alternatively, the user may be verified as the owner of only the first financial account if the matched financial transactions indicate that the financial transaction(s) used in the verification were initiated by a different user.

The IAL for the user is also updated based on the verified ownership of the financial account(s) (operation 310), and the updated IAL is used to enable access to one or more features associated with the financial account(s) by the user (operation 312). For example, the verified ownership of the financial account(s) may represent successful completion of one or more identity-proofing techniques by the user, and the IAL of the user may be increased accordingly. In turn, the increased IAL may allow the user to make modifications to the financial account(s) and/or perform additional types of financial transactions using the financial account(s).

Finally, the matched financial transactions may optionally be used to establish a relationship between the user and another user associated with the second financial account (operation 314). For example, particular types and/or patterns of transactions from the second financial account to the first financial account may be used to establish a customer relationship, employment relationship, landlord-tenant relationship, and/or lending relationship between the users.

Figure 4:
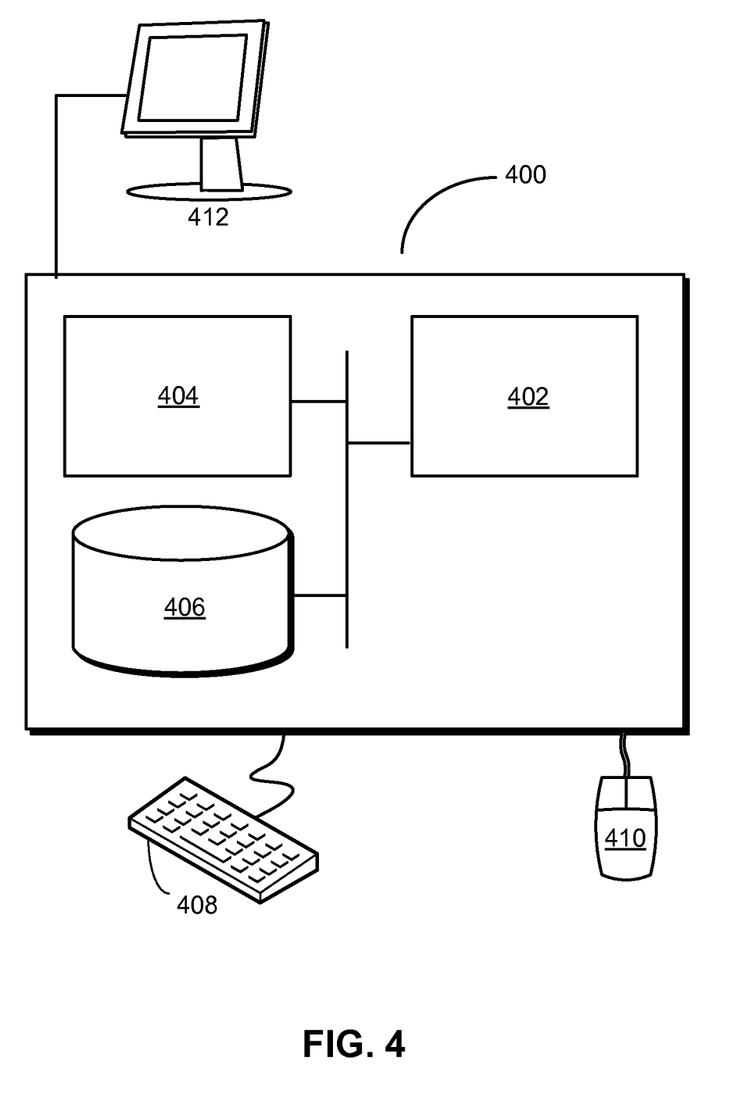
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In particular, computer system 400 may provide a system for verifying user access to financial accounts. The system may include an aggregation apparatus that obtains a first set of financial data representing one or more financial transactions of a first financial account. The system may also include a processing apparatus that matches the one or more financial transactions to a second set of financial data representing issuance of the one or more financial transactions from a second financial account. Next, the processing apparatus may use the matched financial transactions to automatically generate a verification of ownership of the first or second financial accounts by a user without requiring input associated with the one or more financial transactions from the user.

In addition, one or more components of computer system 400 may be remotely located and connected to the other components over a network. Portions of the present embodiments (e.g., aggregation apparatus, processing apparatus, etc.) may also be located on different nodes of a distributed system that implements the embodiments. For example, the present embodiments may be implemented using a cloud computing system that provides automatic transaction-based verification of account ownership for a set of remote users. The distributed system can additionally be scaled to a large number (e.g., millions) of user and/or financial transactions by, for example, adding nodes that implement the disclosed embodiments.

Figure 5:
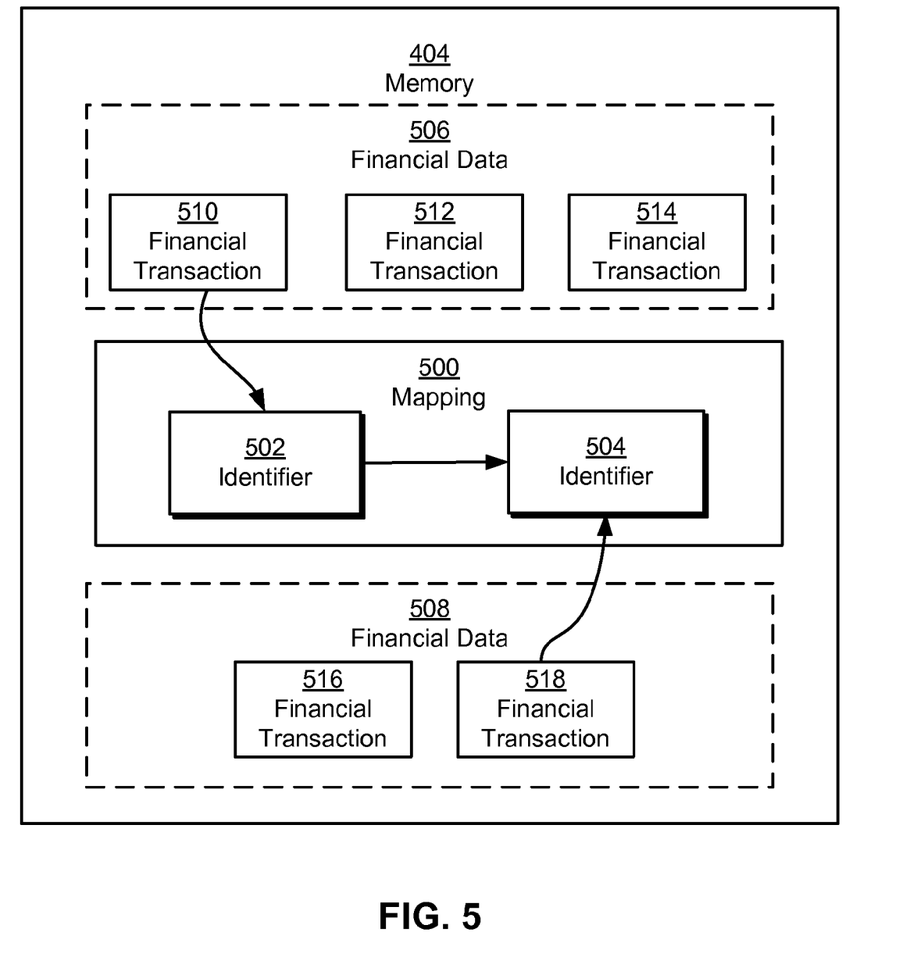
FIG. 5 shows a set of data structures stored in a memory of a computer system in accordance with the disclosed embodiments.

FIG. 5 shows a set of data structures stored in memory 404 of computer system 400 in accordance with the disclosed embodiments. The data structures include two sets of financial data 506-508 from two financial accounts. Each set of financial data 506-508 includes representations of financial transactions 510-518 of the corresponding financial account. For example, financial data 506-508 may include a set of strings representing financial transactions 510-518 issued from or received at the corresponding financial accounts.

The data structures also include a mapping 500 of a first identifier 502 for financial transaction 510 from one set of financial data 506 to a second identifier 504 for financial transaction 518 from the other set of financial data 508. Mapping 500 may be used to represent matched financial transactions 510 and 518 that are used to automatically generate a verification of ownership of the first financial account by a user. For example, mapping 500 may represent the issuance of financial transaction 510 from a financial account from which financial data 506 was obtained and the receipt of a corresponding financial transaction 518 in another financial account from which financial data 508 was obtained. Because mapping 500 identifies the source and destination financial accounts associated with financial transactions 510 and 518, mapping 500 may enable verification of access to or use of one or both financial accounts by the user.

The disclosed embodiments may also be implemented in specialized hardware devices, including specialized circuits for verifying user access to financial accounts. The specialized hardware devices may include an aggregation circuits that obtains a first set of financial data representing one or more financial transactions of a first financial account. The specialized hardware devices may also include a processing circuit that matches the one or more financial transactions to a second set of financial data representing issuance of the one or more financial transactions from a second financial account. Next, the processing circuit may use the matched financial transactions to automatically generate a verification of ownership of the first or second financial accounts by a user without requiring input associated with the one or more financial transactions from the user.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for providing a user access to a feature of a financial account, comprising:
   receiving, at a processing apparatus via a network, a request to access a feature of a first financial account, wherein the feature is associated with a minimum identity assurance level;
   obtaining, by the processing apparatus from a financial data repository in data communication with the processing apparatus, a first set of financial data representing one or more financial transactions of a first financial account;
   obtaining, by the processing apparatus from the financial data repository, a second set of financial data representing one or more financial transactions of a second financial account;

matching, by execution of a processor of the processing apparatus, at least one of the one or more financial transactions of the first financial account to at least one of the one or more financial transactions from the second financial account;

generating, by execution of the processor of the processing apparatus, a first verification of ownership of the first financial account by a user based on the matching at least one of the one or more financial transactions of the first financial account to the at least one of the one or more financial transactions from the second financial account; and increasing, by execution of the processor of the processing apparatus, an identity assurance level associated with the user based on the first verification of ownership, wherein the increased identity assurance level enables the user to access the feature of the first financial account if the increased identity assurance level exceeds the minimum identity assurance level associated with the feature of the first financial account.

2. The method of claim 1, wherein matching the one or more financial transactions to the second set of financial data comprises:

storing the first and second sets of financial data in memory; and storing, in memory, a mapping of a first identifier for the one or more financial transactions from the first set of financial data to a second identifier representing issuance of the one or more financial transactions from the second financial account.

3. The method of claim 1, further comprising:

issuing the one or more financial transactions from the second financial account; and updating the second set of financial data with issuance of the one or more financial transactions from the second financial account.

4. The method of claim 1, further comprising: using the matched financial transactions to establish a relationship between the user and another user associated with the second financial account.

5. The method of claim 4, wherein the relationship is at least one of:

a customer relationship;
an employment relationship;
a landlord-tenant relationship; and
a lending relationship.

6. The method of claim 1, further comprising: using the matched financial transactions to automatically generate a second verification of ownership of the second financial account by the user.

7. The method of claim 1, wherein matching the one or more financial transactions to the second set of financial data comprises at least one of:

matching transaction amounts in the first and second sets of financial data; and using the first and second sets of financial data to verify an issuer of the one or more financial transactions.

8. The method of claim 1, wherein the one or more financial transactions are issued by a service associated with the second financial account.

9. A processing apparatus, comprising:

a processor; and memory storing instructions that, when executed by the processor, cause the apparatus to:

receive, at the processing apparatus via a network, a request to access a feature of a first financial account, wherein the feature is associated with a minimum identity assurance level;

obtain, by the processing apparatus from a financial data repository in data communication with the processing apparatus, a first set of financial data representing one or more financial transactions of a first financial account;

obtain, by the processing apparatus from the financial data repository, a second set of financial data representing one or more financial transactions of a second financial account;

match, by execution of the processor of the processing apparatus, at least one of the one or more financial transactions of the first financial account to at least one of the one or more financial transactions from the second financial account;

generate, by execution of the processor of the processing apparatus, a first verification of ownership of the first financial account by a user based on the matching at least one of the one or more financial transactions of the first financial account to the at least one of the one or more financial transactions from the second financial account; and increase, by execution of the processor of the processing apparatus, an identity assurance level associated with the user based on the first verification of ownership, wherein the increased identity assurance level enables the user to access the feature of the first financial account if the increased identity assurance level exceeds the minimum identity assurance level associated with the feature of the first financial account.

10. The processing apparatus of claim 9, wherein the memory further stores instructions that, when executed by the one or more processors, cause the apparatus to:

issue the one or more financial transactions from the second financial account; and update the second set of financial data with issuance of the one or more financial transactions from the second financial account.

11. The processing apparatus of claim 9, wherein the memory further stores instructions that, when executed by the one or more processors, cause the apparatus to: use the matched financial transactions to establish a relationship between the user and another user associated with the second financial account.

12. The processing apparatus of claim 9, wherein the memory further stores instructions that, when executed by the one or more processors, cause the apparatus to: use the matched financial transactions to automatically generate a second verification of ownership of the second financial account by the user.

13. The processing apparatus of claim 9, wherein matching the one or more financial transactions to the second set of financial data comprises at least one of:

matching transaction amounts in the first and second sets of financial data; and using the first and second sets of financial data to verify an issuer of the one or more financial transactions.

14. A non-transitory computer-readable storage medium storing instructions that when executed by a processing apparatus cause the processing apparatus to perform a method for providing a user access to a feature of a financial account, the method comprising:

receiving, at the processing apparatus via a network, a request to access a feature of a first financial account, wherein the feature is associated with a minimum identity assurance level;

obtaining, by the processing apparatus from a financial data repository in data communication with the processing apparatus, a first set of financial data representing one or more financial transactions of a first financial account;

obtaining, by the processing apparatus from the financial data repository, a second set of financial data representing one or more financial transactions of a second financial account;

matching, by execution of a processor of the processing apparatus, at least one of the one or more financial transactions of the first financial account to at least one of the one or more financial transactions from the second financial account;

generating, by execution of the processor of the processing apparatus, a first verification of ownership of the first financial account by a user based on the matching at least one of the one or more financial transactions of the first financial account to the at least one of the one or more financial transactions from the second financial account; and increasing, by execution of the processor of the processing apparatus, an identity assurance level associated with the user based on the first verification of ownership, wherein the increased identity assurance level enables the user to access the feature of the first financial account if the increased identity assurance level exceeds the minimum identity assurance level associated with the feature of the first financial account.

15. The non-transitory computer-readable storage medium of claim 14, the method further comprising:

issuing the one or more financial transactions from the second financial account; and updating the second set of financial data with issuance of the one or more financial transactions from the second financial account.

16. The non-transitory computer-readable storage medium of claim 14, the method further comprising: using the matched financial transactions to establish a relationship between the user and another user associated with the second financial account.

17. The non-transitory computer-readable storage medium of claim 14, wherein matching the one or more financial transactions to the second set of financial data comprises at least one of:

matching transaction amounts in the first and second sets of financial data; and using the first and second sets of financial data to verify an issuer of the one or more financial transactions.

* * * * *